US 6,726,343 B2

United States Patent
Woolston et al.

(10) Patent No.: US 6,726,343 B2
(45) Date of Patent: *Apr. 27, 2004

(54) INTEGRATED CHAMBER ILLUMINATION SYSTEM

(75) Inventors: Mark Woolston, Copper Canyon; Jimmy Ogles, Southlake; Walter Hosiner, Grand Prairie, all of TX (US)

(73) Assignee: Bell & Howell Postal Systems, Inc., Lincolnwood, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 395 days.

(21) Appl. No.: 09/193,982

(22) Filed: Nov. 18, 1998

(65) Prior Publication Data

US 2002/0015301 A1 Feb. 7, 2002

(51) Int. Cl.[7] .................................................. F21V 21/00
(52) U.S. Cl. ........................ 362/249; 362/84; 362/225; 362/241; 362/260
(58) Field of Search .......................... 313/488; 362/249, 362/264, 373, 217, 218, 221, 225, 260, 241, 243, 346, 297, 84, 347, 355

(56) References Cited

U.S. PATENT DOCUMENTS

| | | | | |
|---|---|---|---|---|
| 2,201,153 A | * | 5/1940 | Brown | 362/218 |
| 3,103,156 A | * | 9/1963 | Quin | 313/488 |
| 3,407,325 A | * | 10/1968 | Brown, Jr. | 313/486 |
| 3,717,781 A | * | 2/1973 | Sadoski et al. | 454/248 |
| 4,435,732 A | | 3/1984 | Hyatt | |
| 4,730,930 A | | 3/1988 | Thoreson | |
| 5,207,504 A | * | 5/1993 | Swift et al. | 362/217 |
| 5,517,018 A | | 5/1996 | Zheng | |
| 5,555,065 A | | 9/1996 | Tsukahara et al. | |
| 5,570,947 A | * | 11/1996 | Felland | 362/148 |
| 5,645,337 A | | 7/1997 | Gleckman | |
| 5,677,939 A | | 10/1997 | Oshino | |
| 5,701,015 A | | 12/1997 | Lungershausen et al. | |
| 5,717,964 A | | 2/1998 | Dowe | |
| 5,803,589 A | * | 9/1998 | Lee | 362/221 |
| 5,921,666 A | * | 7/1999 | Preston et al. | 362/341 |

* cited by examiner

Primary Examiner—Sandra O'Shea
Assistant Examiner—John Anthony Ward
(74) Attorney, Agent, or Firm—Patula & Associates P.C.

(57) ABSTRACT

An illuminating system for emitting a uniform amount of intense scattered light. The illumination system comprises an integrated chamber having a cavity large enough to contain at least two florescent lamps and a reflective interior surface. The chamber is further comprised of a front surface and rear surface. The front surface of the elongated chamber has an elongated opening (i.e. front opening) for emitting the light directed from the florescent lamps and the rear surface has a corresponding elongated opening (i.e. rear opening) aligned with the front opening. This rear opening allows a scanning mechanism, such as a camera, to read any information being illuminated through the front opening of the illuminating system. Each florescent lamp positioned within the chamber is coated on its interior with a phosphorous coating, except that during manufacturing a small amount of this phosphorous is removed to create a slot running longitudinally along the florescent bulb that is at least the length of the front opening when the bulb is positioned within the cavity of the chamber. The bulbs are held within the chamber by sockets and positioned such that one bulb is on each side of the front opening. The slot of each bulb is then aligned to direct the light emitted from the slot directly toward the front opening of the chamber.

12 Claims, 4 Drawing Sheets

INTEGRATED CHAMBER ILLUMINATION SYSTEM

FIELD OF THE INVENTION

The present invention relates to an illumination system that emits a more uniform and intense scattered light and is portable to many applications but preferably used in connection with a scanning operation. In particular, the present invention relates to an integrated chamber illumination system that improves the distribution of emitted light and reduces shadowing by utilizing both direct and diffused light.

BACKGROUND OF THE INVENTION

For optimal scanning abilities, the surface of the material to be scanned is illuminated to enable the scanning apparatus to clearly read or take a clear picture of the material. Generally, most scanning systems utilize either fiber optics to illuminate the material to be scanned or flood the surface of the material with a halogen or florescent lamp. The fiber optic systems light the surface of the object by shinning light on one end of a fiber optic cable. The light then travels through the fiber optic cable to the opposing end of the cable and emits the light onto the object to be scanned. While this method of scanning has been generally successful, the projected light through a fiber optic cable is not consistently uniform and can therefore be improved upon.

Similarly, the scanning devices that use halogen or florescent lamps to scan the surface of materials flood the surface of the material with light from the halogen or A florescent lamps. This is typically seen in a desktop type scanning application. Again, while these devices have been generally effective for scanning, they can be improved. Those scanning devices that use halogen lamps tend to produce shadowing. Likewise, those devices that utilize florescent lamps have not been designed to take full advantage of the diffused light being emitted from the lamps but allow much of the diffused light emitted from the lamps to be lost to the surrounding environment.

Two types of light are typically used in a scanning system: diffused light and direct light. The direct light provides intensity, while the diffused light provides uniformity. Until now, no scanning system has taken full advantage of the capabilities provided by both types of light to illuminate the surface of an object.

While desktop type scanning systems use both direct light and diffused light by using aperture bulbs, no attempt is made to direct all of the diffused light from the lamps toward the surface to be scanned and therefore, the uniformity of light offered by diffused light is not taken full advantage of.

One system which takes advantage of the uniformity offered by diffused light is a digital camera calibration system that directs light into a white sphere through a pin-point hole in the sphere. Through another opening in the sphere, a camera takes a picture of the white light in the sphere. This picture is subsequently developed to determine whether the pixel within a given array of the camera falls within the specified values. The white color of the interior surface of the sphere reflects the light directed into the sphere in all directions while maintaining the light within the sphere. Thus, a uniform light source is created in the sphere for the calibration process. Because the light in the sphere is uniform, the picture taken by the camera displays each pixel within a given array and the value of the camera can be easily verified.

While the advantages of providing uniform diffused light to create a clear image picture have been recognized and utilized in other applications, such as the digital camera calibration application discussed above, until now, no one has utilized the full capabilities of diffused light to create an extremely uniform illuminating light source. Similarly, no one used the full capabilities of diffused light in connection with a direct light source to create an illumination system which supplies a uniform, high intensity light source with minimal shadowing.

SUMMARY OF THE INVENTION

Accordingly, it is the primary object of the present invention to provide an illumination system that emits an extremely uniform amount of light by directing both diffused light and direct light to a central opening in an illumination device.

Still another object of the present invention is to provide an illumination system that reduces light shadowing, outputs more scattered light and increases the obtainable depth-of-field.

Yet another object of the present invention is to provide an illumination system that is small, self-contained and can be used in connection with a variety of applications.

In accordance with these and other objects, the present invention provides an illumination system for emitting a uniform amount of intense scattered light. The illumination system comprises an integrated chamber having a cavity large enough to contain at least two florescent lamps and a reflective interior surface. The chamber is further comprised of a front surface and rear surface. The front surface of the elongated chamber has an elongated opening (i.e. front opening) for emitting the light directed from the florescent lamps and the rear surface has a corresponding elongated opening (i.e. rear opening) aligned with the front opening. This rear opening allows a scanning mechanism, such as a camera, to read information being illuminated through the front opening of the illumination system.

Each florescent lamp positioned within the chamber is coated on its interior with a phosphorous coating, except that during manufacturing a small amount of this phosphorous is removed to create a slot running longitudinally along the florescent bulb that is at least the length of the front opening when the bulb is positioned within the cavity of the chamber. The bulbs are held within the chamber by sockets and positioned such that one bulb is on each side of the front opening. The slot of each bulb is then aligned to direct the light emitted from the slot directly toward the front opening of the chamber.

DETAILED DESCRIPTION OF THE DISCLOSURE

Figure 1:
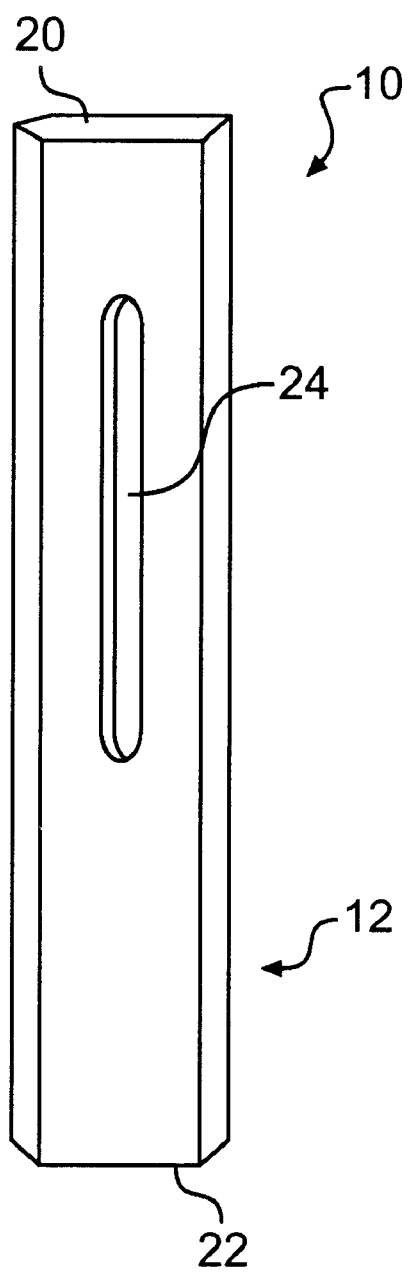
FIG. 1 is a front perspective view of the illuminating system of the present invention.
Figure 2:
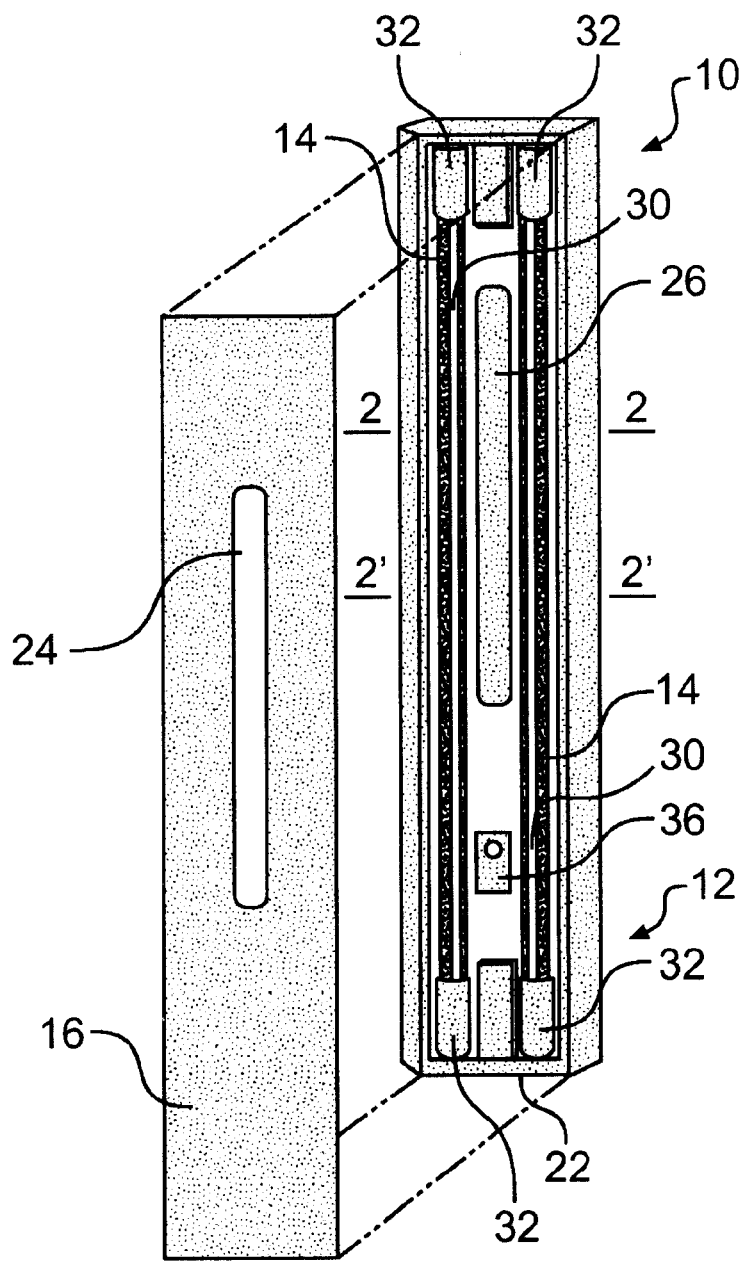
FIG. 2 is a front exploded view of the illuminating system of the present invention as shown in FIG. 1.

As seen in FIGS. 1–4, the present invention relates to a unique illumination system 10 that is comprised of a light integrated chamber 12, made preferably of aluminum, having at least two lamps 14 for emitting light from the chamber 12, a power supply (not shown) for illuminating the lamps 14, and a reflective interior surface. The chamber 12 has a large cavity for containing the lamps 14 and a front panel 16, rear panel 18, a top panel 20, bottom panel 22 and side panels 23. Light is emitted from the chamber 12 through an elongated opening 24 in the front panel 16 of the chamber 12 (i.e. front opening 24). As seen in FIGS. 1–4, an elongated opening 26 is also located on the rear panel 18 of the chamber 12 (i.e. rear opening 26). This rear opening 26 corresponds in size and shape, and is positioned in alignment with, the front opening 24.

Figure 4:
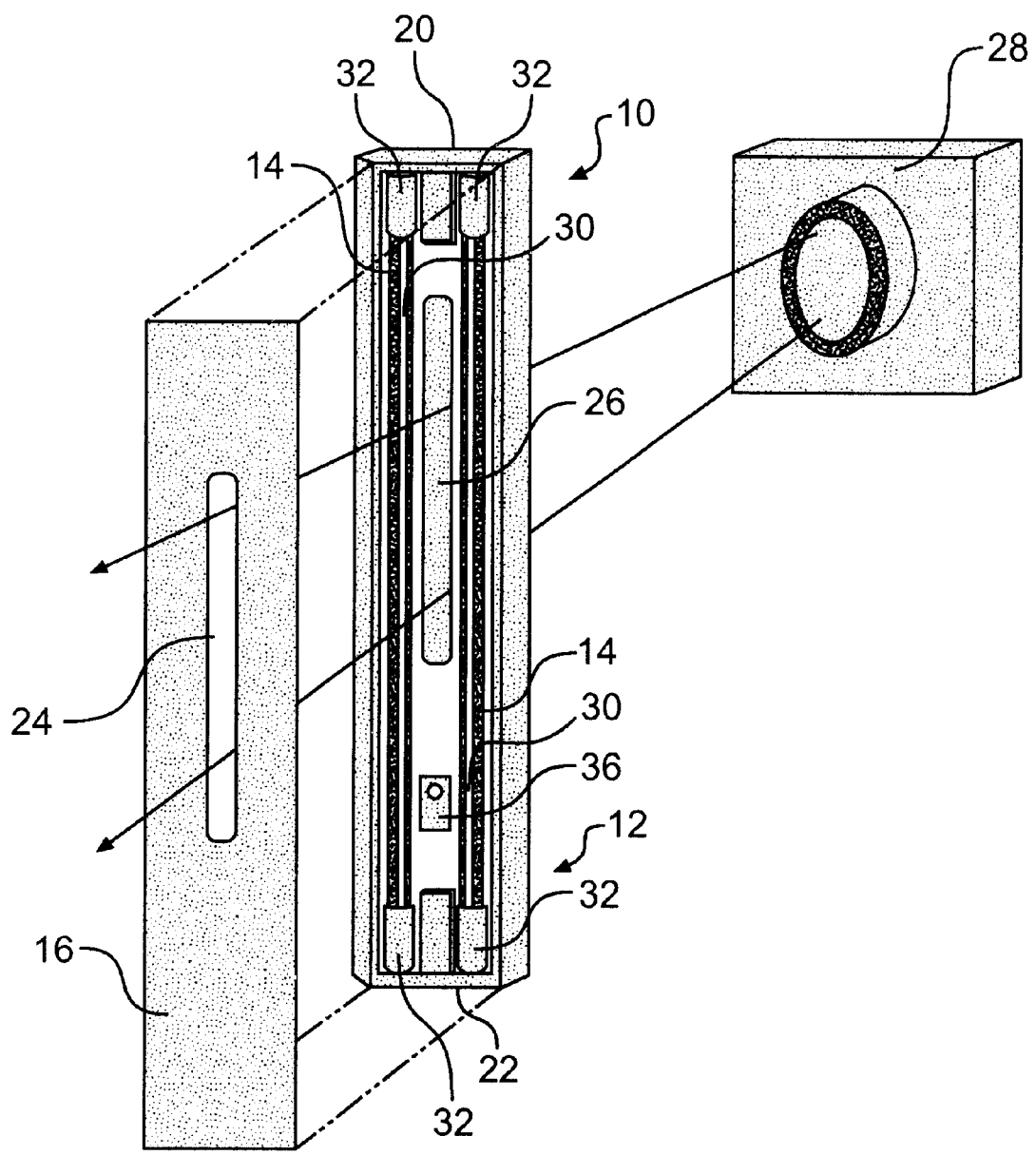
FIG. 4 is a front perspective view of the illumination system in FIG. 2 as used with a camera in a scanning operation.

In one embodiment, this illumination system 10 is used in connection with a scanning system for scanning objects that pass in front of the illumination system 10. For an example, see the illustration in FIG. 4. During operation, light is emitted from the front opening 24 of the chamber 12 to illuminate objects passing before the front opening 24 of the chamber 12 so that the objects can be read or recorded by a scanning mechanism, such as a camera 28 or other like device. As seen in FIG. 4, the information on the object is read by the scanning mechanism or camera 28 through the front and rear openings 24 and 26 of the illumination system 10. While it is illustrated that this illumination system 10 be used in connection with a scanning mechanism, such as a camera 28, the illumination system 10 of the present invention can used in connection with other applications that require illumination of objects.

The unique aspect of the present invention is the encompassing and the placement of the two lamps 14 within the chamber 12. The lamps 14 of the present invention are high voltage, high frequency lamps that have a phosphorous coating 34 on the interior of the lamps 14, such as florescent 9-watt bulb or similar type lamp. During manufacturing, a small amount of the phosphorous coating 34 is scraped off the inside of each lamp 14 to form an approximately 1/10" in width slot 30 that runs the entire length of the longitudinal axis of each lamp 14. This slot 30 allows each lamp 14 to emit a small amount of direct light from the lamp 14 through the front opening 24 of the chamber 12. Each lamp 14 is then positioned with the chamber 12 so that the direct light emitted from the slot 30 in the lamp 14 is focused toward the front opening 24 of the chamber 12. While it is preferred that the slot 30 run the entire length of each lamp 14, it is only necessary that the slot 30 run at least the length of the front opening 24 when each lamp 14 is secured within the illumination chamber 12.

The two lamps 14 are positioned such that one lamp 14 is on one side of the elongated openings 24 and 26 and the other lamp 14 is on the opposing side of the openings 24 and 26 and such that the longitudinal axis of each lamp 14 runs parallel to the longitudinal axis of the front and rear openings 24 and 26. Similarly, the lamps 14 are positioned far enough to each side of the openings 24 and 26 so that the lamps 14 do not obstruct the view of the scanning mechanism through the openings 24 and 26.

Each lamp 14 is held within the chamber 12 and powered by two sockets 32. Thus, a total for four sockets 32 are contained within the chamber 12 for maintaining and powering the lamps 14. Two of the sockets 32 are on the interior of the top panel 20 of the chamber 12, while the other two sockets 32 are positioned on the interior of the bottom panel 22 of the chamber 12 in alignment with the two sockets 32 positioned on the top panel 20 of the chamber 12. Each lamp 14 will therefore be held at its top by one socket 32 and at its bottom by another.

Figure 3:
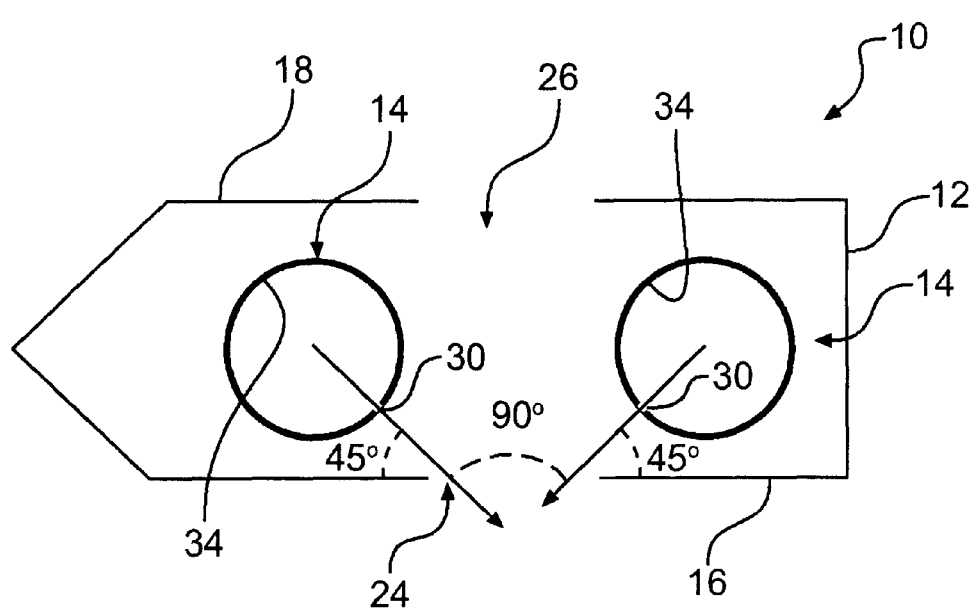
FIG. 3 is a plan view of the cross-sectional portion of FIG. 2 taken between lines 2—2 and lines 2'—2'.

As seen in FIG. 3, the direct light emitted from the slot 30 in each lamp 14 is directed toward the front opening 24 of the chamber 12. The lamps 14 are positioned so that the elongated slot 30 of each lamp 14 is preferably at a forty-five degree (45°) angle relative to the front opening 24. With each lamp 14 being positioned so that the slot 30 is at a forty-five degree (45°) angle from the front opening 24, the light emitted from each slot 30 will be at a ninety degree (90°) angle from the light omitted from the other. At this angle, the maximum amount of direct light is emitted from the chamber 12 through the front opening 24. The focusing and use of such direct light through the front opening 24 creates an intense illuminating light.

Although it is preferred that the angle of the direct light be positioned at a forty-five degree (45°) angle relative to the front opening, various angles can be utilized for the direction of direct light through the front opening 24. For example, any angle between the range of twenty degrees (20°) and sixty-five degrees (65°) can be used. A variation in this angle may even be preferred depending upon the application. A lesser degree angle from the front opening 24 will create a direct light projection that covers a broader area, while a larger angle will provide a greater depth of field.

In the present invention, the intense illumination provided by the direct light works in conjunction with the diffused light being emitted through the phosphorous covered portions 34 of the lamps 14 to supply an intense, uniform array of light on the objects to be scanned.

While a small amount of direct light is emitted through the slots 30 in the lamp 14, a larger portion of light is being emitted through the phosphorous coating 34 of the lamps 14, creating a diffused light. This diffused light is emitted from the lamps 14 in all directions and reflects off the interior surface of the chamber 12 until the diffused light is able to escape through the front and rear openings 24 and 26 in the chamber 12. Due to the design and reflective properties of the interior of chamber 12, a majority of the diffused light exits through the front opening 24 in the chamber 12, thereby providing a uniform flow of light from the front opening 24 of the chamber 12. The exiting of this diffused light with the direct light creates a very uniform and intense illuminating light.

As mentioned previously, the integrated chamber 12 is preferably made of aluminum. The interior surfaces of the front panel 16 and side panels 23 of the chamber 12 are polished to create a reflective surface, while the interior surface of the rear panel 18 is covered with a highly reflective material such as white titanium paint or the like to create a rear surface having higher reflective properties than the interior surfaces of the front and side panels 16 and 23. By having a rear surface with higher reflective properties, more light is reflected toward the front of the chamber 12, thereby increasing the chances of diffused light escaping through the front opening 24 of the chamber 12 rather than the rear opening 26. Although aluminum is the preferred material for the chamber 12, other materials that have either reflective properties or are coated to have reflective properties may used with the present invention. The key aspect of the chamber 12 design is that the diffused light emitted through the phosphorous portion 34 of the lamp 14 is reflected off the interior surfaces of the chamber 12 until the reflected light escapes through the front opening 24 of the chamber 12.

In order to maintain a constant intensity of light, a small light monitor 36 may be placed within the chamber 12 to monitor the intensity of the light source. Over time, the lamps 14 tend to accumulate dust or simply dim with age. The light monitor 36 will then detect any decrease in the light level and signal the lamp power supply to increase the output current to compensate for the decreased efficiency of the lamps 14. By increasing the current, the intensity of the lamps 14 will proportionately increase.

Additionally, the illumination system 10 of the present invention may be equipped with a small fan (not shown) placed at the bottom of the chamber 12 for forcing air into the chamber 12. Since the lamps 14 are preferably 9-watt florescent bulbs, there is no need to cool the lamps 14. The purpose of the fan therefore is to cause a small amount of static pressure to build up inside the chamber 12 and help to deflect dust from entering into the chamber 12.

In operation, the present invention preferably functions to illuminate the surface of a material, such as an envelope or other material displaying useful and desirable information, and enable efficient reading and recording of the information on such material. For example, in mail handling and processing, the address must be read from each piece of mail and captured by camera 28 to properly sort and route each piece of mail. To accomplish this, each piece of mail rapidly passes before the illuminating system 10 such that the necessary information on the mail piece can be viewed through the front and rear openings 24 and 26 of the illumination system 10. The illumination system 10 then, through its intense, uniform, scattered light output, illuminates the area before the system 10 so that camera 28, or other scanning device, can read and record the information on the mail piece. As seen in FIG. 4, the camera 28 views and records the information as the information on each mail piece passes in front of the openings 24 and 26.

While the present invention has been disclosed in reference to the disclosed embodiments, other arrangements will be apparent to those of ordinary skill in the art and are to be considered within the spirit and scope of the present invention. The invention is, therefore, to be limited only as indicated by the scope of the claims that follow and their equivalents.

We claim:

1. An illuminating system comprising:
   (a) a chamber defined by a front panel, side panels and a rear panel, each of said front panel, side panels and rear panel having an interior surface with reflective properties, said front panel having a single elongated front opening through which opening direct and diffuse light generated within said chamber is directed;
   (b) at least two lamps positioned within said chamber, both of said lamps positioned longitudinally parallel and adjacent to the single front opening of said front panel, one of said lamps positioned on one side of the single front opening and the second of said lamps positioned on the opposing side of the single front opening;
   (c) each said lamp having a longitudinal slot that extends at least the length of the single front opening that emits direct light from said lamp through said single front opening, the remainder of the lamp being coated with a coating material through which diffuse light is emitted, each lamp being positioned within said chamber such that the longitudinal slot of each said lamp emits direct light directly toward the single front opening of the chamber;
   (d) the interior surface of said front panel, side panels and rear panel of the chamber scattering the diffuse light emanating from the lamps through the coating material until the diffuse light escapes the chamber though the single front opening of the chamber.

2. An illumination system as recited in claim 1 wherein each lamp is positioned within said chamber such that the direct light emitted from the slot of each lamp is emitted at an angle between 20 and 65 degrees from the front opening of said chamber.

3. An illumination system as recited in claim 1 wherein said at least two lamps are fluorescent lamps and said coating material is phosphorous.

4. An illumination system as recited in claim 1 wherein the chamber is comprised of aluminum and said interior surface is polished aluminum.

5. An illumination system as recited in claim 1, wherein said rear panel has an interior surface having a higher reflective property than an interior surface of said front panel and side panels.

6. An illumination system as recited in claim 5, wherein said back panel is coated with white titanium paint to provide its surface with said higher reflective property.

7. An illumination system as recited in claim 1 wherein said rear panel has a rear single elongated opening that is aligned with the front opening in said front panel, providing an unobstructed sight line from said rear opening to said front opening.

8. An illumination system as recited in claim 1 further comprising a fan located at the bottom of said chamber for creating a small amount of static pressure within the chamber to deter the accumulation of dust within the chamber.

9. An illumination system as recited in claim 1 further comprising a light monitor placed within said chamber for detecting decreases in light intensity of said lamps.

10. A method for illuminating an object, said method comprising the steps of:
    (a) encompassing a fluorescent lamp withing a chamber, said lamp having a longitudinal slot that emits direct light from said lamp, the remainder of the lamp being coated with a coating material for emitting diffuse light from the lamp through the coating, said chamber having a single front opening for emitting direct and diffuse light from said chamber, said chamber being defined by chamber walls having a reflective interior surface for reflecting, without focusing, the diffuse light emitted from said fluorescent lamps off the interior surface of said chamber walls until said diffuse light is emitted through the single front opening in said chamber; and
    (b) directing a small amount of direct light directly out of the opening in said chamber, without the use of reflectors, such that both direct and diffuse light is emitted through the single front opening in said chamber.

11. An improved illumination system for a scanning device, comprising:
    a chamber defined by a chamber walls, said chamber walls having a reflective interior surface, said chamber further having a front opening and a rear opening defining an unobstructed sight line for said scanning device from said rear opening to said front opening; and
    at least one lamp mounted in said chamber, said at least one lamp having a coating material for emitting diffuse light, and an uncoated slot for emitting direct light, said at least one lamp positioned adjacent said sight line and situated such that said direct light travels from said slot directly through said front opening at an angle, and said diffuse light travels from said coating material through said front opening after being scattered within said chamber by said reflective interior surface of said chamber.

12. The illumination system of claim 11, wherein said interior surface of said chamber includes a rear interior surface, wherein said rear interior surface of said chamber having a higher reflective property than the remainder of said interior surface of said chamber.

* * * * *